Aug. 21, 1928.
R. M. GALLOWAY
1,681,289
SAFETY POSITIVE FEED TAP
Filed July 18, 1925   2 Sheets-Sheet 2
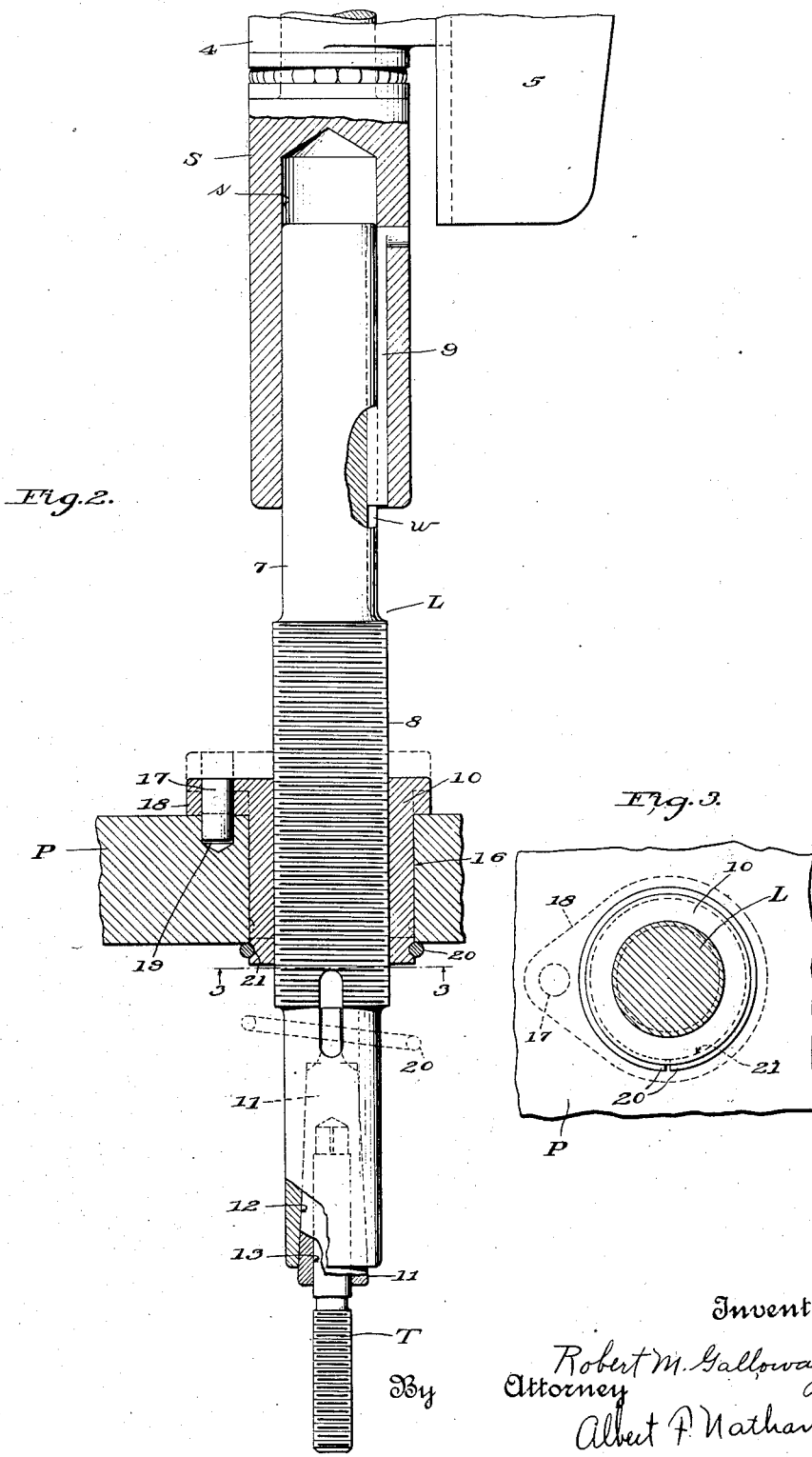

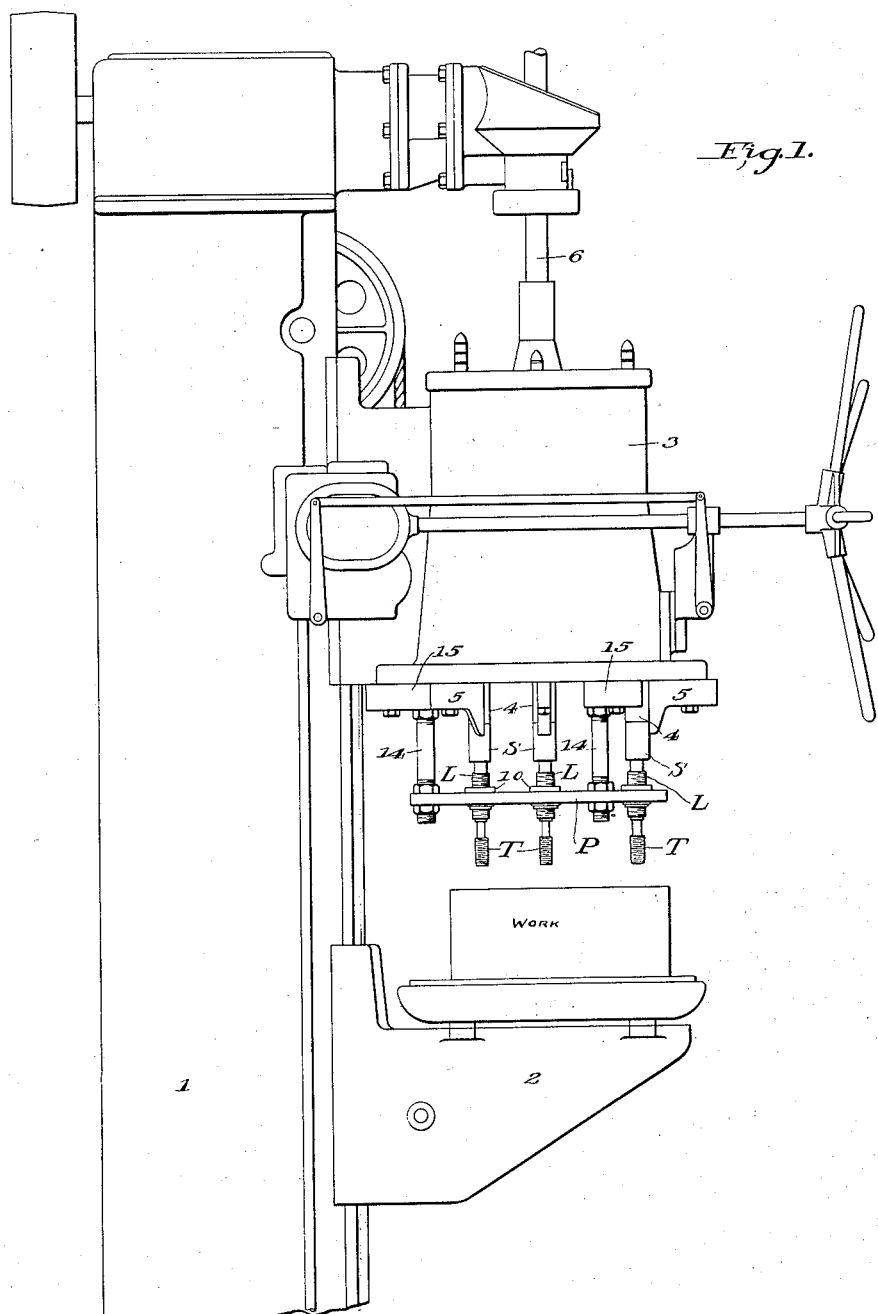

Patented Aug. 21, 1928.

1,681,289

UNITED STATES PATENT OFFICE.

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA.

SAFETY POSITIVE-FEED TAP.

Application filed July 18, 1925. Serial No. 44,441.

This invention relates to drilling and tapping machines and it deals more particularly with means to prevent damage to the machine in the event that the tap should break during a tapping operation or should the tap come into contact with the bottom of the hole, thereby preventing further axial movement of the tap.

This invention may be used to advantage in those multiple spindle tapping machines in which each of the taps is translated independently of every other tap by means of a lead-screw associated with each spindle and having a threaded engagement with a suitable lead-nut, but it is to be understood that the invention is also adaptable to various other types of tapping machines.

In application Serial No. 44,440 filed July 18, 1925 there is shown, described and claimed, in combination with a multiple spindle tapping machine, means comprising a lead-screw and nut for giving individual axial movement, at unequal rates, to the various taps. In that application, however, the lead-nuts are rigidly supported and therefore rotation of the lead-screw necessarily produces axial movement of the lead-screw and tap carried thereby. In the operation of the construction forming the subject of the above mentioned application should the tap break between the spindle and the work the lead-screw and the shank of the tap continues to rotate and the broken-off portion of the tap acts as an abutment to prevent further axial movement of the lead-screw. Inasmuch as the continued rotation of the lead-screw effects relative axial movement between the lead-screw and nut it is obvious that the entire mechanism will be put under a severe strain until some part thereof fails.

This invention has for an object to provide means to give individual axial movement to the spindles of tapping machines and to combine therewith means to protect the actuating mechanism against undue strains should the tap be restrained against its usual axial movement.

More specifically, the invention has for an object to provide means comprising a lead-nut and a relatively rotatable and translatable lead-screw associated with each tap to give said tap individual axial movement and to combine therewith means to discontinue the axial movement of the lead-screw upon breakage of the tap and upon the tap being restrained against further axial movement, such as by contacting with the bottom of the hole being tapped. A further object of the invention is to provide means for giving to taps individual axial movement comprising a normally stationary lead-nut and a cooperating rotatable and translatable lead-screw and so to support said lead-nut that under abnormal conditions the nut may be caused to translate to prevent further axial movement of the lead-screw and the tap carried thereby.

These objects have been attained by translatably but non-rotatably attaching to each tap spindle a suitably threaded lead-screw adapted to carry a tap, and having said lead-screw threaded through a lead-nut non-rotatably and non-translatably supported by the tool-head. A friction device, preferably but not necessarily in the nature of a split-ring fitted to an annular groove in the lead-nut holds the nut against translation under normal working conditions but permits the nut to be released from its support when a predetermined strain thereon is exceeded, such as might be caused by breakage of the tap, or by the end of the tap striking the bottom of the hole. When the nut is released from its support it is free to be translated on the lead-screw (it being temporarily held against rotation) and therefore further axial movement of the lead-screw and tap is precluded.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevation of a portion of a multiple spindle drilling and tapping machine embodying the present invention. Fig. 2. is an enlarged sectional view showing the means for giving a tap individual axial movement and for permitting the lead-nut to be disengaged from its support. Fig. 3 is a section on the line 3—3 of Fig. 2.

Referring more particularly to the drawings the invention is disclosed as embodied in a multiple drilling and tapping machine comprising a standard 1 upon which is adjustably supported a work-table 2 and a tool-head 3. Within bearings 4, carried by arms 5 adjustably secured to the tool-head, are rotatably journaled tool-spindles S adapted selectively to be rotated individually at any one of a plurality of rates from a power shaft 6 entering the tool-head at the top. Inasmuch as the means for rotating the spindles and for varying their individual speed of rotation are conventional and form no part of this invention detailed illustration and description thereof is deemed unnecessary. The spindle supporting arms are universally adjustable on the tool-head and therefore any desired arrangement of spindles may be secured. Although Fig. 1 shows only three spindles carried by the tool-head it is to be understood that this is merely illustrative and that in practice either a greater or a less number may be employed.

As hereinbefore stated this invention provides means to translate the tools individually as they are rotated by the spindles. To this end each spindle has translatably but non-rotatably secured with its bore $s$ the shank 7 of a lead-screw L. A spline 9, carried by the spindle, is fitted to a way $w$ in the shank 7 and thereby causes the lead-screw to be rotated with the spindle. The lead-screw is formed with a threaded portion 8 which engages a normally stationary lead-nut 10, and therefore rotation of the screw in the nut causes the screw to be moved in the direction of its length. The lead-screw is adapted to carry standard taps T of various sizes and these taps may be connected with the spindle by means of a tapered adapter 11 fitted within a tapered bore 12 in the lead-screw and formed with a tap-receiving socket 13.

The nut 10 may be non-rotatably supported in any suitable manner such for example as by being secured in a plate P suspended beneath the tool-head on bars 14 carried by arms 15 adjustably secured to the tool-head 3. In practice the pitch of the threads of the lead-screw and nut will be the same as the pitch of the tap and it readily will be perceived that inasmuch as the nut 10 is held against rotation and translation (by means later to be described) rotation of the lead-screw will cause axial movement of the lead-screw and the tap T carried thereby. This axial movement serves to feed the tap into the work.

It sometimes happens, in the operation of tapping machines, that a tap breaks, and in that event the broken off portion becomes a stationary abutment which prevents further axial movement of the remaining part of the tap and its actuating mechanism without stopping its rotation. Inasmuch as relative rotation between the lead-screw and nut necessarily causes relative axial movement of the two, this continued rotation, after the axial movement of the tap was arrested, has heretofore caused the mechanism to be put under great strain until some part thereof failed, such as the stripping of the threads in the lead-nut.

This invention contemplates a construction in which the lead-nut will be held in its operative position during the normal operation of the machine but in which the lead-nut automatically will be released from its support and become the translated member, under the action of the threads on the lead-screw, when abnormal axial strains are applied thereto, such as may be produced by the end of the tap striking the bottom of the hole or by breakage of the tap as hereinbefore described. To this end the lead-nut is fitted in a socket 16 formed in the support P and is held against rotation therein by means of a pin 17 fixed in a flange 18 of the nut and entering an aperture 19 in said support. The nut is frictionally held in its socket by any suitable means, such for example, as by a split ring 20 fitted within an anular groove 21 in the nut and engaging the underside of the plate P. It will readily be perceived that, with this construction, should the lead-screw be held against axial movement while it is being rotated the back pressure on the nut will gradually increase until it becomes sufficiently great to cause the inclined walls of the annular groove 21 to expand the split ring and release the nut. Thus released, the nut will back off on the threaded portion 8 of the lead-screw until it reaches its dotted line position shown in Fig. 2 in which position the pin 17 is disengaged from its retaining aperture 19 and the nut will rotate idly with the lead-screw.

From the foregoing, it will be perceived that this invention provides means adaptable to either single spindle or multiple spindle tapping machines for feeding the tap any predetermined amount at each rotation thereof. Also that it provides a simple and efficient safety device to prevent damage to the parts when, for any reason, translation of the lead-screw is prevented while its rotation is continued. Although specific means have been shown and described for normally preventing rotation and translation of the lead-nut it is to be understood that this invention contemplates various other means for accomplishing the same result.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A tapping machine combining a rotatable spindle; a lead-screw rotatable with said spindle and translatable relatively thereto; a cap carried by said lead-screw; a member located intermediate the spindle and the tap and formed with a socket and an aperture; a lead-nut located in said socket and having a threaded engagement with said lead-screw, whereby rotation of the lead-screw effects axial movement thereof; a flange on one end of said lead-nut engaging one side of said member positively to hold said lead-nut against movements in one direction; a stud projecting from said flange and entering the aperture in said member positively to hold the nut against rotary movement, and a releasable retainer engaging said nut at the opposite side of said member impositively to hold the nut against movement in the opposite direction, said retainer being adapted to be overcome by a predetermined strain on said lead-screw.

2. A tapping machine combining a rotatable spindle; a lead-screw rotatable with said spindle and translatable relatively thereto; a tap carried by said lead-screw; a support; a lead-nut sustained by said support and having a threaded engagement with said lead-screw; an interlocking connection between said nut and said support positively to hold said lead-nut against rotation; means impositively to hold said nut against translation toward the work whereby the relative rotation between the lead-screw and lead-nut normally effects translation of the former; means operative when a predetermined strain is applied to said lead-screw successively to render said translation and rotation holding means inoperative, to permit said lead-nut first to be translated on said lead-screw a substantial amount and then rotated therewith.

3. A tapping machine combining a rotatable spindle; a lead-screw rotatable with said spindle and translatable relatively thereto; a tap carried by said lead-screw; a support provided with an aperture; a nut sustained by and projecting through said support and having a threaded engagement with said lead-screw; means comprising a pin carried by said nut and engaging the walls of said aperture for positively holding said nut against rotation in its support; means normally preventing axial movement of said nut whereby the relative rotation of said screw and nut effects translation of the former, said last named means comprising a split ring arranged in an annular groove in the projecting portion of said nut and adapted to engage said support, said annular groove providing an inclined wall adapted to expand said ring and cause it to be disengaged from said nut when an abnormal pressure is applied to said lead-screw.

In witness whereof, I have hereunto subscribed my name.

ROBERT M. GALLOWAY.